July 14, 1970  H. W. KOGELNIK ET AL  3,520,584
METHOD AND APPARATUS FOR OBTAINING 3-DIMENSIONAL
IMAGES FROM RECORDED STANDING WAVE PATTERNS
Filed March 14, 1967  4 Sheets-Sheet 1

SHUTTER

INVENTORS H. W. KOGELNIK
R. KOMPFNER
J. R. PIERCE
BY Wilford L. Wisner
ATTORNEY

July 14, 1970  H. W. KOGELNIK ET AL  3,520,584
METHOD AND APPARATUS FOR OBTAINING 3-DIMENSIONAL
IMAGES FROM RECORDED STANDING WAVE PATTERNS
Filed March 14, 1967  4 Sheets-Sheet 3

United States Patent Office 3,520,584
Patented July 14, 1970

3,520,584
METHOD AND APPARATUS FOR OBTAINING 3-DIMENSIONAL IMAGES FROM RECORDED STANDING WAVE PATTERNS
Herwig W. Kogelnik, Summit, Rudolf Kompfner, Middletown, and John R. Pierce, Warren, N.J., assignors to Bell Telephone Laboratories, Incorporated, Murray Hill, N.J., a corporation of New York
Filed Mar. 14, 1967, Ser. No. 623,099
Int. Cl. G02b 27/22
U.S. Cl. 350—3.5       5 Claims

ABSTRACT OF THE DISCLOSURE

Images having the parallax properties of three-dimensional images, optionally in full color, can be obtained from a recorded standing-wave pattern, formed with white-light illumination in a photographic emulsion backed by an essentially planar structure of tiny corner reflectors. The structure may include three-sided corner reflectors or may be transmissive dielectric spheres having reflective back hemispheres and a low-loss dielectric entrance medium of one-half the refractive index of the spheres. Formation of the image can be obtained by point source illumination along the line of view. Widening of angular limits for field of view and lessening of unwanted color overlap can be achieved by using the same three colors of monochromatic light both during exposure and viewing.

BACKGROUND OF THE INVENTION

Our invention involves the recording of the direction and the intensity of light rays employed to produce images, especially images having three-dimensional properties.

The techniques presently available for this purpose are generally termed "holography" and involve the formation of a record in which the contrast of spacing of interference fringes are a sort of spatial transform of intensities and phases of portions of a light wavefront formed by initially coherent light that is scattered from an object. Improvements of the basic technique have enabled the reconstruction of a useful wavefront from the record with ordinary white light. Nevertheless, it has not been possible to illuminate the object in an effective manner with ordinary white light, during the making of the record.

In a relatively unrelated area of photographic optics, the Lippmann process photography has been developed in order to provide an improved technique of two-dimensional color photography. Typically, a photographic emulsion is backed by a smooth reflector, such as a layer of mercury. The exposing light wavefront sets up a pattern of standing waves having nodes at the reflector. Developable silver ions are produced in largest numbers at the anti-nodes of the standing wave. Development of the emulsion yields a periodic layer structure of reduced silver. This layer structure has a periodic variation of the index of refraction and produces interference of portions of subsequent illumination reflected at different layers. Constructive interference occurs only for the light wavelength that performed the exposure at each point. Thus, reproduction of the original colors at the appropriate locations can be obtained.

SUMMARY OF THE INVENTION

We have recognized that a new type of color photography that provides images with properties, e. g., parallax, of three-dimensional images can be provided by forming a standing-wave pattern responsive to the direction of incoming rays scattered from the object, recording this pattern in a suitable emulsion or other photoresponsive medium and illuminating this pattern at appropriate frequencies or from appropriate angles to produce a wavefront that can be formed, e. g., by the eye, into the image. Unlike the patterns formed in Lippman process photography, the standing-wave patterns are responsive to the direction of incoming rays and permit image depth information to be preserved; and, unlike holographic methods, no reference beam is used.

In two specific embodiments of our invention, the standing-wave patterns are formed with the aid of an array of corner reflectors disposed behind the photosensitive medium. The dimensions of the corner reflectors are determined by the dimensions of the smallest spot that is to be resolved by the system.

BRIEF DESCRIPTION OF THE FIGURES

A more complete understanding of the present invention can be obtained from the following detailed description taken together with the drawing in which.

DESCRIPTION OF ILLUSTRATIVE EMBODIMENTS

Figure 1:
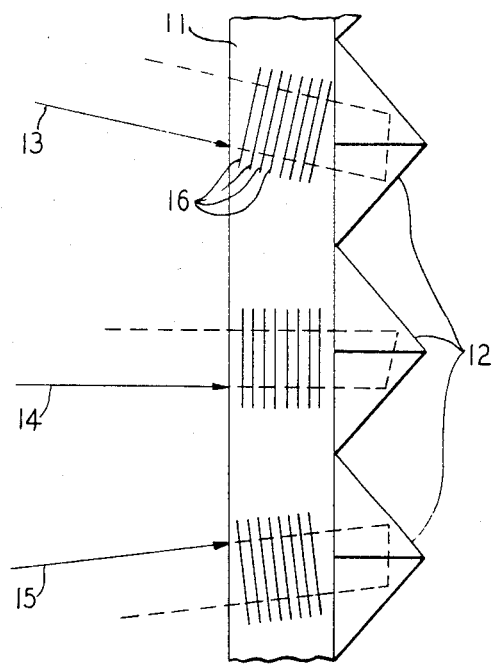
FIG. 1 is a partial sectional view of a photographic emulsion and a few corner reflectors of the backing structure, together with a superimposed diagram of rays and standing waves showing how the directional information that provides depth or parallax information in an image is preserved.

In FIG. 1 the standing waves in the photographic emulsion 11 are illustrated by solid lines at the wave maxima to show how the inherent properties of the corner reflectors 12 preserve the directional information present in the incoming rays of various colors. Illustratively, the rays of interest are designated 13, 14 and 15. Assume that the ray 13 has the wavelength $\lambda_1$, which might be the wavelength of green light, for example. The green light happens to be propagating predominantly in the direction shown at the illustrated point of incidence. In prior art Lippmann process photography, the normal component of all such green rays regardless of direction is recorded at all points of incidence to produce an effect that destroys the directional information carried by the incident radiation. In the present invention, the corner reflector 12 that is immediately behind the emulsion at this point reflects the transmitted portion of the ray 13 back along the path along which it entered. Thus, the standing-wave pattern forms layers 16 of developable silver that are normal to the incident direction of the ray 13, rather than being parallel to the surface of the emulsion as in the prior art Lippmann process.

It is an inherent property of a corner reflector that it reflects incident radiation in a direction substantially anti-parallel to its direction of incidence. Similar results are obtained with the rays 14 and 15 which are illustratively incident at other points, in other directions and with other wavelengths, $\lambda_2$ or $\lambda_3$, or colors. Regardless of the point of incidence of any such ray, there will be some corner reflector 12 behind the emulsion which will receive the transmitted portion of that ray and return it anti-parallel to its direction of incidence, provided the corner reflectors 12 are arranged edge to edge.

The rays 13, 14 and 15 have been shown to be incident at different points in order to simplify the illustration of the standing-wave patterns. Nevertheless, it should be understood that, particularly where emulsion 11 has some appreciable thickness, that these three standing-wave patterns might also exist in the same region. In that case, there are sufficient amounts of silver present to make the overlapping layers formed to be substantially complete. The solid lines in each of the illustrated standing-wave patterns indicate the locations of anti-nodes, or maxima, of the standing-wave pattern, at which relatively large numbers of developable silver ions are produced by the ray that forms the standing-wave pattern.

Figure 2A:
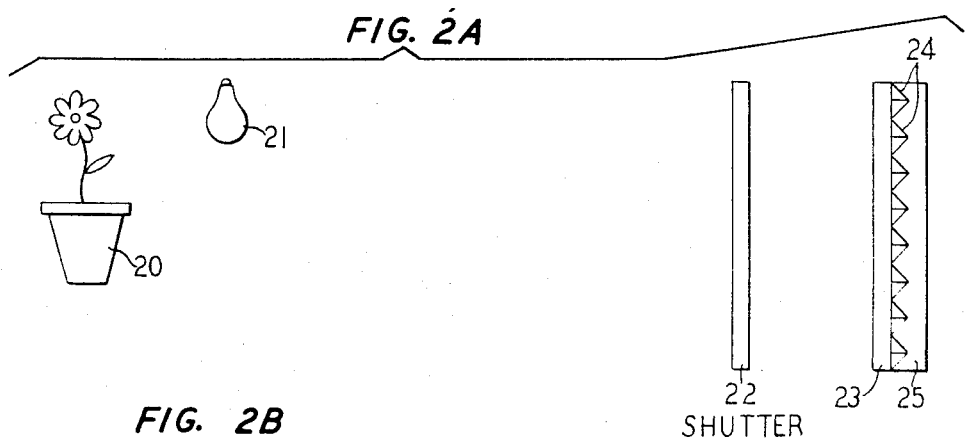
FIG. 2A is a partially pictorial and partially block diagrammatic illustration of an arrangement employed in practicing an exposure step of a method according to our invention.

Reference is now made to FIG. 2A in which an arrangement for the exposure step is illustrated, so far as is practicable, in its actual physical form but suitably enlarged in order to aid explanation. In FIG. 2A, an object 20, illustratively a flowerpot, is illuminated with white light from a source 21 such as an incandescent bulb. The unfocused scattered wavefront is passed through a suitable shutter 22 and allowed to fall upon the photographic emulsion 23 which is backed by an array of corner reflectors 24 which are formed edge to edge by a technique to be described hereinafter. The corner reflectors 24 are illustratively pyramidal identations in a sheet of material mounted in a frame 25; and each has three mutually perpendicular sides as in the corner of a cube. The three sides of each indentation are substantially symmetrically disposed with respect to a normal to the array. In fact, one might visualize that they could be formed by pressing the corner of a tiny cube into the substrate at each location so that all the indentations lie edge to edge and have an aperture measuring four mils (4/1000 of an inch) along each edge. As in all color photography, the length of time that the shutter 22 is kept open depends upon the speed of the color-sensitive emulsion 23.

In the described technique, as in the Lippmann process, the coherence requirements on the exposing light are relatively relaxed. The needed coherence lengths are of the order of twice the sum of the emulsion thickness and the spacing between the emulsion and the corner reflectors.

Figure 2B:
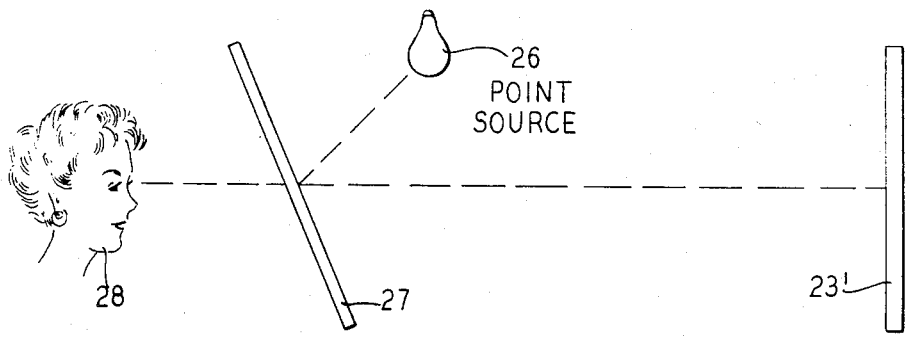
FIG. 2B is a partially pictorial and partially block diagrammatic illustration of an arrangement employed in practicing the image-forming step of the method according to our invention.

In FIG. 2B, Bragg reflection from the developed emulsion 23' is employed to reconstruct an essentially three-dimensional color image. A point source 26 of white light illuminates the developed emulsion 23' via reflection from a partially transmissive mirror or beam splitter 27 behind which the person 28 or apparatus viewing the film is positioned so that he receives light returned from the emulsion 23' and passed through the beam splitter 27. It should be noted that his line of sight is substantially collinear with the axis along which light from point source 26 propagates after its reflection from beam splitter 27. Thus, the developed emulsion 23' is effectively illuminated from the point of view in this arrangement.

Constructive interference of the light returned from the developed emulsion 23' occurs, that is, the Bragg condition is fulfilled, only for those rays of substantially the same directions and wavelengths that would have entered the eye of the observer if he had been observing the original object disposed in his line of sight and illuminated as it was illustrated during the exposing of the emulsion 23 in FIG. 2A. It is assumed here that the Bragg response of the reflecting layers is quite sharp. Each ray that enters his eye is the product of constructive interference of light reflected from the reduced silver layers that were formed from developable silver ions by a like ray during the exposure process. The direction of the original rays and thus the information concerning depth, or at least parallax, in the image is fully preserved in the direction of the constructively interfering rays.

The corner reflector array of FIG 2A may be fabricated by one of the following methods: One such method is to form a die which includes tiny pyramidal projections to fit the desired indentation of the reflective structures. It would comprise about 360,000 tiny pyramidal projections assembled edge to edge in a square array, each having been individually machined to have three mutually perpendicular faces substantially symmetrically disposed with respect to a normal to the array. Illustratively, the die is made of a hard material, such as a tool steel; and it works upon oxygen-free copper. Preferably, the oxygen-free copper, or other reflector material, can be formed on the die by electro-forming, as known in the metal-working art. Nevertheless, other methods of working can be employed. For example, the die could stamp the array in a suitable reflective material.

Figure 3A:
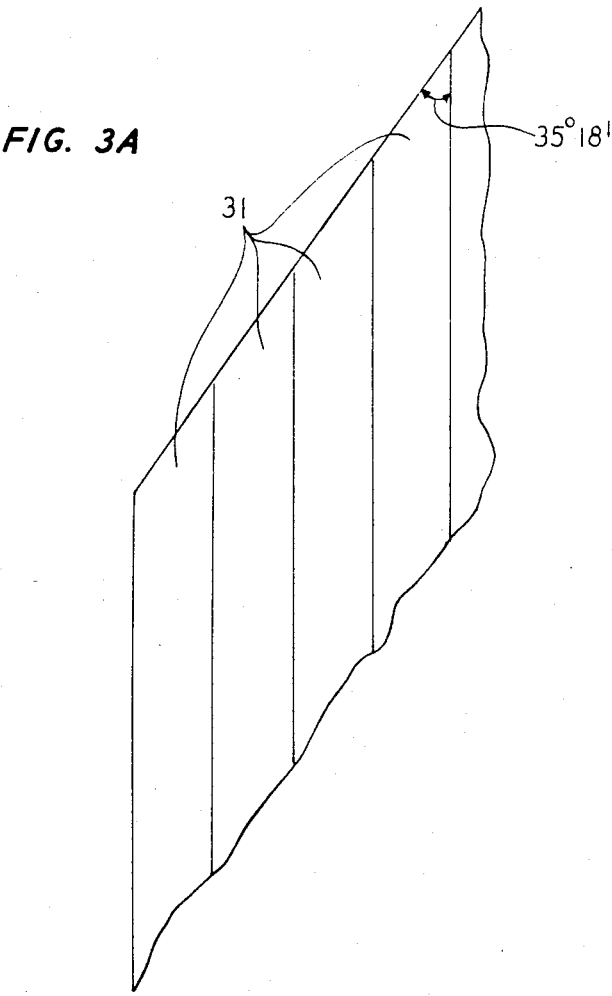
FIG. 3A is a partial pictorial illustration of a laminate structure from which a tool used in making the corner reflectors of FIG 2A is made.
Figure 3B:
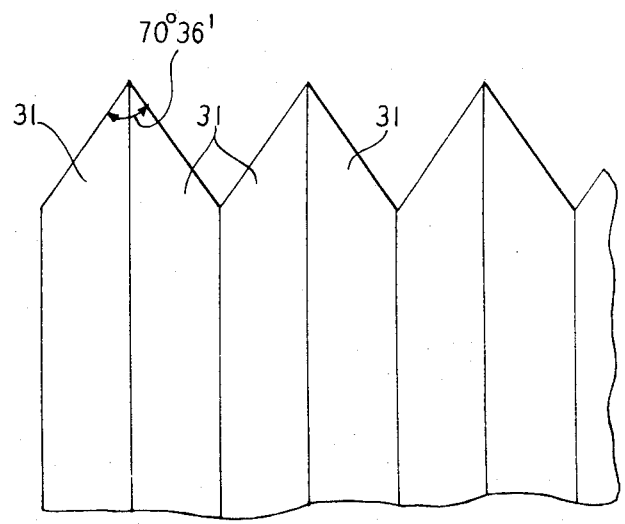
FIG. 3B is a partial pictorial illustration of the working portion of the tool made from the laminate structure of FIG. 3A.

Another method of forming the tool, or die, is achieved by first making a secondary tool, as illustrated in FIGS. 3A and 3B.

In FIG. 3A, about six hundred plates 31 of tool steel, each about two mils (2/1000 of an inch) thick are stacked or laminated and are then held in a suitable jig so that the indicated 35°18' cut across the ends of the plates can be made. The plates are then disassembled, alternate ones turned around and reassembled to form the tool, of which the working portion is shown in FIG. 3B.

The tool edges formed by adjacent plates each have an included angle of 70°36', as indicated.

The tool is then pressed into a plate of oxygen-free copper, rotated 60°, pressed again, rotated 60° and pressed again. This process is repeated until the pyramidal projections of the primary tool are defined sufficiently accurately. The structure of corner reflectors is then electroformed upon this primary tool from suitable reflective material, such as aluminum. The electroformed structure is then pulled away from the oxygen-free copper die and mounted to form an array (24, 25) like that of FIG. 2A. The apertures of the corner reflectors thus made measure four mils on a side.

Figure 4:
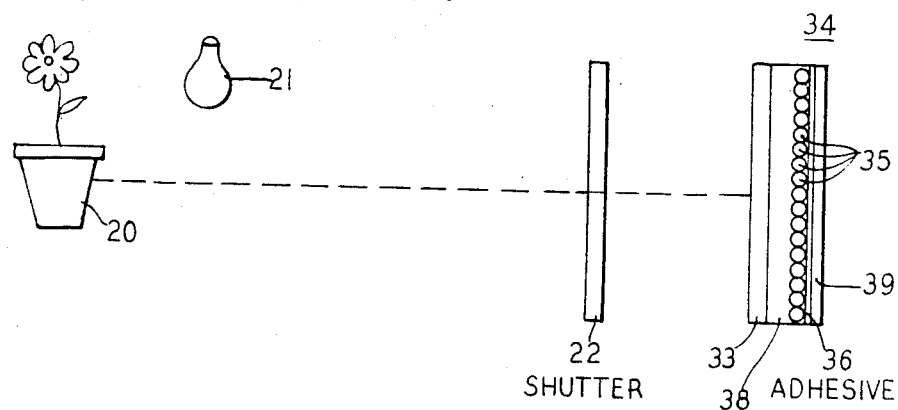
FIG. 4 is a partially pictorial and partially block diagrammatic illustration of a modified arrangement employed in practicing the exposure step of the method according to our invention.

In FIG. 4 there is illustrated another specific arrangement of an assembly of an emulsion and an array of corner reflectors, which can be substituted for the emulsion 23 and corner reflectors 24 of FIG. 2A. This arrangement and its associated method are also disclosed and are specifically claimed in the commonly-assigned, concurrently-filed application, Ser. No. 623,067, of A. G. Fox.

Figure 5:
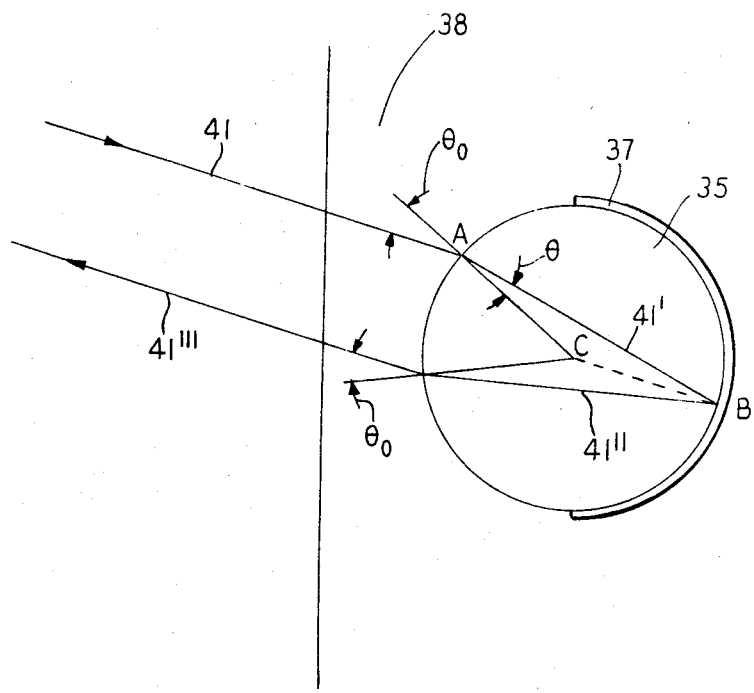
FIG. 5 is a diagram that is useful in explaining how the backing structure of FIG. 4 works.

In the arrangement of FIG. 4, the emulsion 33 is part of an assembly 34, which also includes a regular array of four-mil diameter dielectric spherical elements 35, illustratively of arsenic trisulfide, having reflective back hemispheres 37, as shown in FIG. 5. The elements 35 are mounted, at the centers of their reflective hemispheres 37, on a suitable adhesive 36, illustratively cellophane tape, and disposed on the back plate 39 of the assembly 34. The remainder of the assembly 34 is filled with a matching oil 38 of the fluorocarbon series AAA having an index of refraction of approximately 1.3. This index of refraction is half the index of refraction of arsenic trisulfide ($As_2S_3$) glass which ranges from approximately 2.53 to 2.69 in the visible region of the spectrum.

In FIG. 5 there is provided a geometric construction which illustrates why this combination of dielectric spherical elements 35 and dielectric entrance medium 38 provides the effect of an array of corner reflectors. An incident ray 41 travels through the matching oil 38 and is incident typically at a relatively small angle, $\theta_0$, with respect to the normal of the sphere 35 and is refracted to propagate still closer to the normal at an angle $\theta$, in the higher-density medium. The diffracted ray 41' will be reflected at the reflective coating 37 and will propagate as the ray 41'' to a point where it passes from the sphere 35 into the matching oil 38 as the ray 41'''. It can be shown from the symmetry of the geometry that the ray 41''' leaves the sphere at the angle $\theta_0$ with respect to the normal but on the opposite side of the normal to the sphere as compared to the entering ray 41. In order to render the exiting ray 41''' parallel to the entering ray 41, it is necessary that the angle $\theta_0$ be one-half of the angle between the two normals, or radii of the sphere, as may be appreciated from considerations of symmetry. The point of reflection will then lie on a radius that is parallel to the incoming ray. An isosceles triangle ABC is formed for which $\theta_0$ is equivalent to the exterior angle formed by extending radius CB backwards through point C and the two nonadjacent interior angles are both $\theta$. Thus, $\theta_0 = 2\theta$. The law or refraction states that $$n_0 \sin \theta_0 = n \sin \theta \quad (1)$$

where $n$ is the index of refraction of the sphere material 35, $n_0$ is the index of refraction of the matching oil 38, $\theta_0$ is the angle of ray propagation with respect to the normal to the sphere 35 within the matching oil 38 and the angle $\theta$ is the angle with respect to the normal to the sphere 35 within that sphere. The foregoing relationship can be simplified whenever $2 \sin \theta$ can be substituted for $\sin 2\theta$ that is, for $\theta$ less than or equal to about 15° ($\theta_0$ equal to about 30°). Then $$n = 2n_0 \quad (2)$$

if the ray 41''' is to be parallel to the ray 41.

It should be noted that $\theta_0$ is not the angle of incidence of an incoming ray with respect to a normal to the array of corner reflectors. The latter angle may be larger or smaller than $\theta_0$.

It will be noted that the possible refraction of the light rays at the interface between the emulsion 33 and the oil 38 is disregarded since compensating refractions occur upon opposite traversals of that interface.

For the purposes of this disclosure, the reflector assembly 34 can be considered as the equivalent of an array of corner reflectors, in the generic sense.

In FIG. 4 the spheres 35 are illustratively placed edge to edge in a two-dimensional array and are at least as small as four mils in diameter. For a conventional television-type picture, a resolution of 600 spots or lines in either direction is desired so that approximately 360,000 of the spheres 35 are employed. The resulting array will be approximately two inches square.

Reconstruction from the developed film made from emulsion 33 is accomplished as illustrated in FIG. 2B.

The reflector assembly 34 of FIG. 4 may be fabricated as follows: Spherical elements 35 of arsenic trisulfide glass are formed from a molten batch of arsenic trisulfide by forcing a thin jet of the molten material into a vacuum so that it tends to form into spherical droplets under the influence of its own surface tension. The droplets are then radiatively cooled during their fall to a series of sieves which separate them according to size. Such techniques for forming small spherical elements are well known in the ball-bearing art and may readily be employed for the present purposes. The spherical elements of arsenic trisulfide glass thus formed are selected after the sieving operation so that all are of four-mil diameter or less. Then, hemispherical reflective coatings are provided on them by sputtering, vacuum deposition, or similar process. The backing adhesive 36 is then attached to the centers, approximately, of the reflective hemispheres of the elements 35 to make a close-packed edge-to-edge arrangement. The adhesive is then mounted upon the backing plate 39 and the assembly completed by filling with the fluorocarbon matching oil as described above. Further details concerning the nature and selection of such oils may be found in the book Practical Refractometry by R. N. Allen, Cargille Labs., Inc., New York, second edition, 1962.

The embodiment of FIG. 4 may be modified by substituting some other appropriate transmissive dielectric material for arsenic trisulfide. For example, titanium dioxide is transmissive in most of the visible region of the spectrum and has an index of refraction very close to that of arsenic trisulfide. Various other dielectric materials are also suitable for use with other mixtures of matching oils employed as the entrance medium.

For good operation during the forming of images from films exposed as in FIGS. 2A or 4, it is necessary that the Bragg angle reflection is both strong enough and of sufficiently small angular response to eliminate unwanted color overlap. The latter requirement is also the reason that the in-line re-illumination with a point source is employed.

Figure 6A:
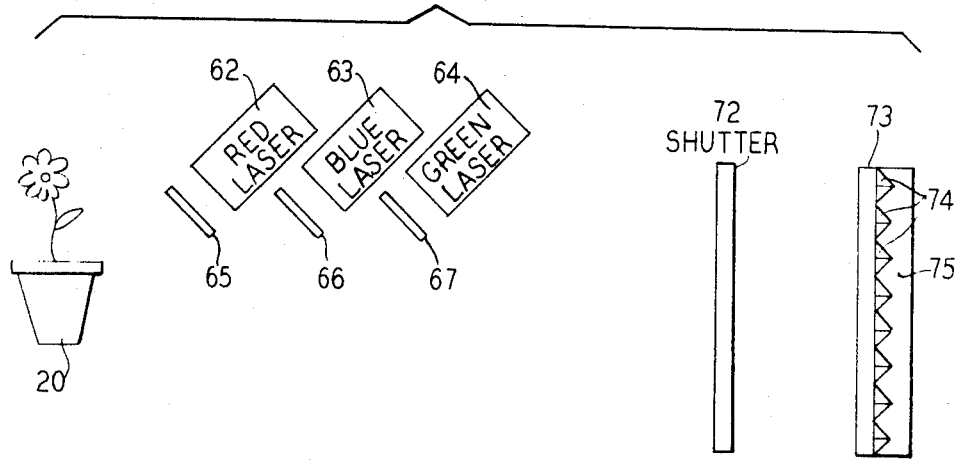
FIG. 6A is a partially pictorial and partially block diagrammatic illustration of another modified arrangement employed in practicing the exposure step of the method according to our invention.
Figure 6B:
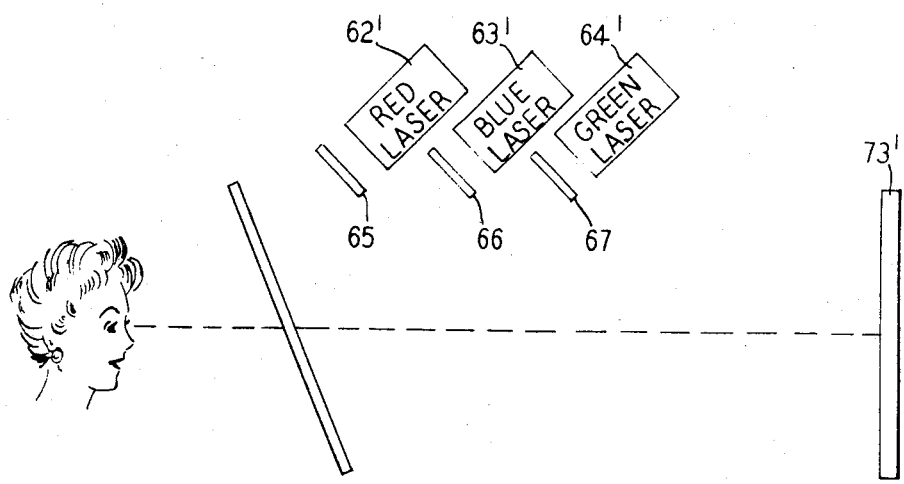
FIG. 6B is a partially pictorial and partially block diagrammatic illustration of a modified arrangement employed in practicing the image-forming step of our method when the exposure step has been performed with the arrangement of FIG. 6A.

Color overlap can be reduced by re-illuminating the developed emulsion 23' or 33' with essentially the same selected colors, illustratively three, as may have been used in exposing the emulsion. Such exposure and re-illumination schemes are shown in FIGS. 6A and 6B, respectively. Implicit in such schemes is the use of a limited number of relatively monochromatic wavelength bands, or ultimately, of laser radiation, illustratively obtained from lasers 62, 63 and 64 in FIG. 6A, during exposure and from lasers 62', 63', and 64' during re-illumination. While such a modification may have some advantages, it entails somewhat greater expense. Lasers 62', 63' and 64' may have wavelengths adjusted proportionally with respect to the wavelengths of lasers 62, 63 and 64 to compensate for shrinkage of the emulsion during development. In employment of the arrangements of FIGS. 6A and 6B, the techniques are essentially the same as for FIGS. 2A and 2B. There is now a wider field of view in the respect that the viewer can move his head around through a larger solid angle without moving the light sources.

The lasers 62 and 62' are illustratively helium-neon lasers operating at 6328 angstrom units. The lasers 63 and 63' are illustratively argon ion lasers operating at 5145 angstrom units; and the lasers 64 and 64' are illustratively argon ion lasers operating at 4880 angstrom units. The filters 65, 66 and 67 are filters suitable for lasers 62, 63 and 64, respectively.

It will be noted that, in the preceding discussion, the term "field of view" has been used in the sense of motion of the eye of the viewer relative to the re-illumination source. A much freer observation of the parallax present in the images formed in the arrangements of FIGS. 2B and 6B can be achieved by tilting or turning the developed emulsion while avoiding relative motion between the viewer's eye and the re-illumination source of sources. Even in this mode of observation, the arrangement of FIG. 6B permits a broader range of angular variation than the arrangement of FIG. 2B.

The presently proposed methods of FIGS. 2B and 6B for forming the image from the developed emulsions may not make full use of all the information stored in the standing-wave patterns recorded in the developed emulsion. The stored information is as complete as that provided by holography employing a reference beam, although recorded in a different form. It is expected, therefore, that alternative methods of re-illumination can be provided to produce an image that is as fully three-dimensional as three-dimensional holographic images.

What is claimed is:

1. A method of recording and reproducing image information, comprising the steps of forming a standing-wave pattern in a photographic medium from a light wavefront scattered from an object and admitted through a shutter to said medium, comprising reflecting portions of said wavefront from respective reflective elements disposed behind said medium with respect to said shutter and shaped to direct said portions antiparallel to their respective directions of incidence at said elements to preserve in said medium information concerning depth in the object, and illuminating said medium from an external source to provide a parallax-preserved image of said object.

2. A method according to claim 1 in which the reflecting step comprises reflecting the portions of the wavefront from the reflective elements comprising a multiplicity of corner reflectors that respectively intercept different ones of said portions.

3. A method according to claim 2 in which the illuminating step comprises directing the illumination from the external source along a line of sight along which the image is to be viewed.

4. A method according to claim 3 in which the forming step includes supplying light from a first plurality of essentially monochromatic sources of different wavelengths to be scattered from the object, and the illuminating step includes directing light upon the medium from a second plurality of essentially monochromatic sources of wavelengths related to the wavelengths of said first plurality of sources.

5. A method according to claim 1 in which the reflecting step includes reflecting said wavefront from an array of corner reflectors each substantially symmetrically disposed with respect to a normal to the array.

References Cited

UNITED STATES PATENTS 3,269,839    8/1966    Altman _____ 350—105

OTHER REFERENCES

Denisyuk, "On the Reproduction of the Optical Properties of An Object by the Wave Field of its Scattered Radiation," Optics & Spectroscopy, vol. 15, No. 4, October 1963, pp. 279–284.

Collier, "Some Current Views on Holography," IEEE Spectrum, July 1966.

DAVID SCHONBERG, Primary Examiner

R. L. SHERMAN, Assistant Examiner